Patented Sept. 23, 1930

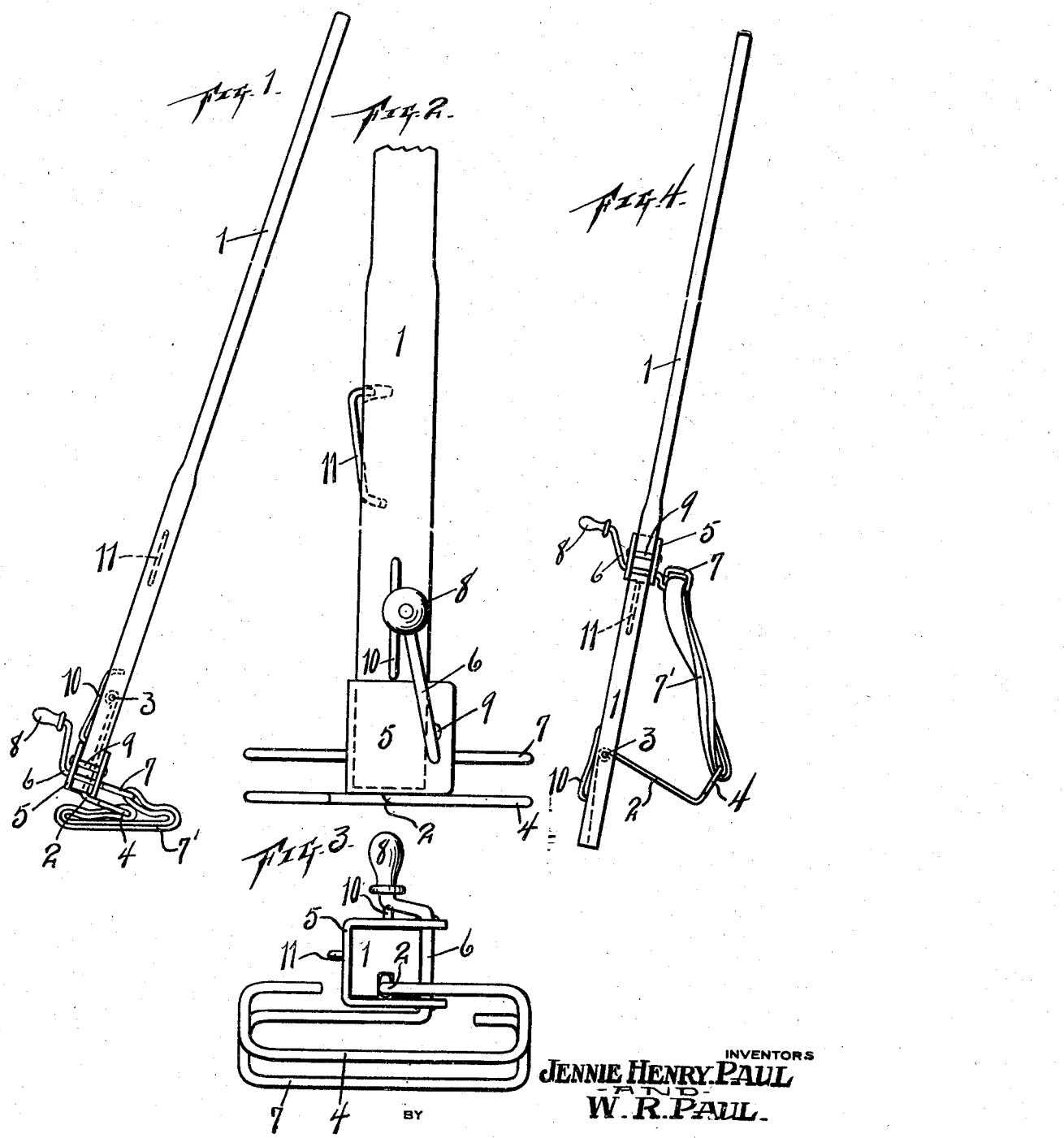

1,776,687

UNITED STATES PATENT OFFICE

JENNIE HENRY PAUL AND WILLIAM ROBERT PAUL, OF AMARILLO, TEXAS

COMBINED MOP AND WRINGER

Application filed March 17, 1930. Serial No. 436,590.

Our invention relates to mops and more particularly to a combined mop and wringer; and the object is to provide a simple mopping and wringing device which is easily operated and quickly adjustable for either the locking or the mopping positions and which can be furnished at small cost and which can be made in any suitable size. Other objects and advantages will be fully explained in the following description and the invention will be more particularly pointed out in the claims.

Reference is had to the accompanying drawings which form a part of this application.

Fig. 1 is a side elevation of the device used as a mop.

Fig. 2 is a plan view of the same on a larger scale, the handle being broken away.

Fig. 3 is an end view without a mopping cloth.

Fig. 4 is a side elevation of the device used as a wringer.

Similar characters of reference are used to indicate the same parts throughout the several views.

The mop and wringer is provided with a handle 1 on which the working parts are carried. One loop 4 has a shank 2 which is pivotally connected to the handle 1 by a shank pivot bolt 3. A slot is formed in the handle 1 for the shank. The working parts are held in mopping position by a slidable holder 5 which is shoved down on the handle and telescopes on the shank 2 and is automatically locked in position by a snap latch 10. The holder 5 cannot go off the end of the handle because of the loop 7 which is formed on the extension of the handle crank 6, and catches against the loop 4 on the extension of the shank 2. The shank 2 can be swung to the position shown in Fig. 4 for wringing purposes.

The device has a wringer attachment consisting of a loop 7 and a shank 6 which is journaled in the slidable holder 5. The holder 5 is a U-shaped device of sheet metal and is held on the handle by a bolt 9 which is riveted in the edges of the holder. The holder 5 is easily slidable on the handle 1 and is automatically locked in place by the snap latch 10 for mopping purposes and is locked in wringing position by a snap latch 11, the latch 11 catching under or behind the lower edge of the holder as indicated in Fig. 4. A handle 8 is provided for turning the shank 6.

The loops 4 and 7 are held in mopping position as shown in Fig. 1. A piece of cloth or other flexible material 7' is caught in the loops 4 and 7 and held as shown in Fig. 1 during a mopping operation. When the mopping cloth is to be wrung, it is brought to the position shown in Fig. 4 and the handle 8 used to turn the shank 6 which carries the loop 7 and winds the loop 7'.

Various changes in the sizes, proportions, construction and arrangement of the several parts may be made without departing from our invention.

What we claim, is,—

1. A combination mop and wringer comprising a handle provided with a slot in the lower end, a loop for holding mopping material and a shank integral therewith and adapted to lie in said slot and a pivot bolt connecting said shank to said handle, a holder slidable on said handle for carrying a wringing member, a wringing member consisting of a loop terminating with a shank adapted for use as a shaft journaled in said holder and a handle integral with said shaft for turning the shaft, and snap latches for locking said holder both in mopping position and in wringing position, said loops being adapted to carry mopping material.

2. A combination mop and wringer comprising a handle provided with a slot in the lower end, a loop for holding mopping material terminating with a shank at right angles to said loop and adapted to lie in said slot, a pivot connecting said shank to said handle, a U-shaped holder mounted and slidable on said handle and adapted to hold said shank in said slot, a snap latch on said handle adapted to lock said holder in its holding position for mopping purposes, a loop for holding said mopping material terminating with a shank shaft journaled in said holder at one side thereof and a handle integral with said shank shaft, and a snap latch for locking said holder in wringing position.

In testimony whereof, we set our hands, this 20th day of February, 1930.

JENNIE HENRY PAUL.
WILLIAM ROBERT PAUL.